(12) United States Patent
Vöge

(10) Patent No.: US 6,505,537 B1
(45) Date of Patent: Jan. 14, 2003

(54) CUTTING TOOL AND CUTTING EDGE CONFIGURATION THEREOF

(75) Inventor: Rüdiger Vöge, Rottenburg (DE)

(73) Assignee: Ledermann GmbH, Horb am Neckar (DE)

( * ) Notice: Subject to any disclaimer, the term of this patent is extended or adjusted under 35 U.S.C. 154(b) by 0 days.

(21) Appl. No.: 09/601,541

(22) PCT Filed: Dec. 1, 1999

(86) PCT No.: PCT/EP99/09363

§ 371 (c)(1),
(2), (4) Date: Aug. 1, 2000

(87) PCT Pub. No.: WO00/32341

PCT Pub. Date: Jun. 8, 2000

(30) Foreign Application Priority Data

Dec. 1, 1998 (DE) .......................... 198 55 364

(51) Int. Cl.$^7$ .......................... B23D 61/02; B27B 33/20
(52) U.S. Cl. .............................. 83/835; 83/837; 83/846; 83/848
(58) Field of Search .......................... 83/835, 836, 837, 83/838, 839, 840, 841, 842, 843, 845, 676

(56) References Cited

U.S. PATENT DOCUMENTS

| | | | |
|---|---|---|---|
| 2,671,947 A | | 3/1954 | Vander Linde |
| 3,169,435 A | * | 2/1965 | Hartger .......................... 407/60 |
| 3,212,724 A | | 10/1965 | Henderson |
| 3,619,880 A | * | 11/1971 | Pahlitzsch .......................... 407/61 |
| 3,818,561 A | * | 6/1974 | Montana et al. .......................... 144/241 |
| 3,878,747 A | * | 4/1975 | Soderstrom .......................... 407/33 |
| 4,011,783 A | * | 3/1977 | Mobley .......................... 83/846 |
| 4,012,820 A | * | 3/1977 | Nowak .......................... 407/117 |
| 4,133,240 A | * | 1/1979 | Vollmer et al. .......................... 403/118 |
| 4,173,914 A | * | 11/1979 | Vollmer et al. .......................... 83/835 |
| 4,257,302 A | * | 3/1981 | Heimbrand .......................... 144/218 |
| 4,604,933 A | * | 8/1986 | Lesher et al. .......................... 83/839 |
| 4,784,033 A | * | 11/1988 | Hayden et al. .......................... 407/119 |
| 5,425,296 A | * | 6/1995 | Kullmann et al. .......................... 83/676 |
| 6,314,854 B1 | * | 11/2001 | Fritz et al. .......................... 83/835 |

FOREIGN PATENT DOCUMENTS

| | | |
|---|---|---|
| DE | 35 41 077 A1 | 5/1987 |
| DE | 297 07 665 U1 | 10/1997 |
| DE | 298 10 853 U1 | 10/1998 |
| EP | 0 543 789 A1 | 5/1993 |
| EP | 0 691 170 B1 | 1/1996 |
| FR | 2 679 475 | 1/1993 |

* cited by examiner

Primary Examiner—Allan N. Shoap
Assistant Examiner—Stephen Choi
(74) Attorney, Agent, or Firm—Gudrun E. Huckett

(57) ABSTRACT

A cutting tool for separating and formatting of sheet materials has a rotationally driven support body having cutting teeth arranged about a circumference of the support body. The cutting teeth have a tooth profile with a radially outwardly positioned front-cutting area with a separating cutting edge and a formatting area with main cutting edges determining the cutting width of the cutting tool. The tooth profile further has a transition area located radially between the front-cutting area and the formatting area. The main cutting edges in the formatting area are arranged radially separately from the separating cutting edges of the front-cutting area by the transition area, wherein the transition area has transition cutting edges adjoining the cutting edges and angled relative to the separating cutting edges toward a radial center axis of the cutting tool. The front-cutting area is symmetrical relative to the radial center axis of the cutting tool.

12 Claims, 2 Drawing Sheets

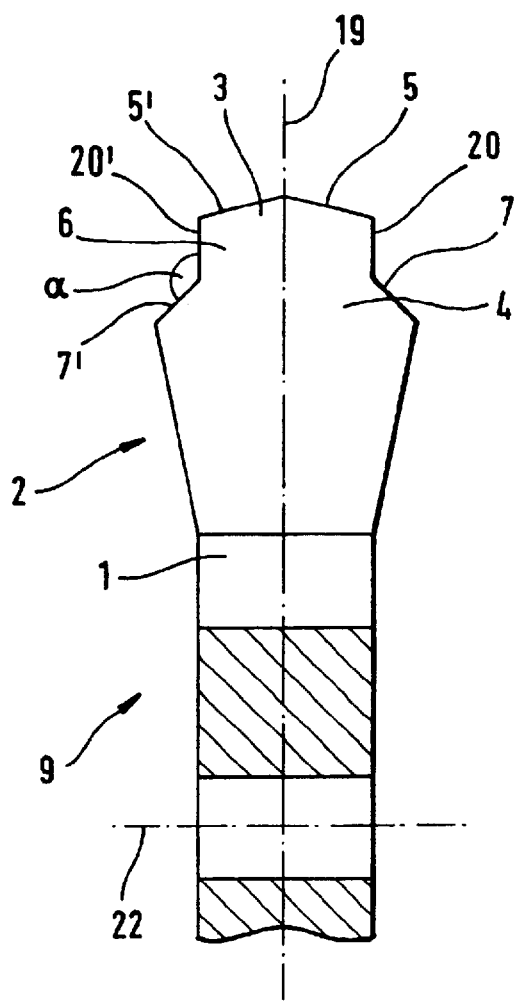
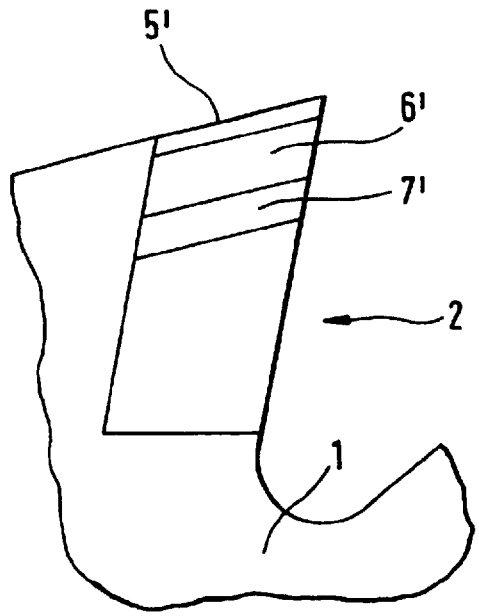
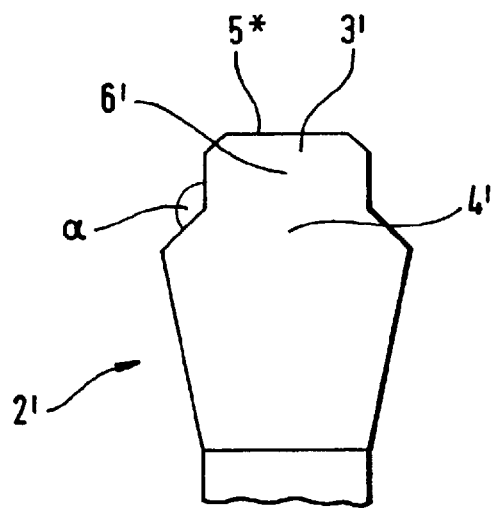

CUTTING TOOL AND CUTTING EDGE CONFIGURATION THEREOF

BACKGROUND OF THE INVENTION

The invention relates to a cutting tool for separating and/or formatting sheet material such as plastic material sheets, light metal sheets, wood sheets and the like, with a rotationally drivable support body on whose circumference a plurality of cutting teeth with a cutting edge arranged on the tooth profile is provided, wherein the cutting teeth have a radially outwardly positioned front-cutting area in which a separating cutting edge is formed and are provided with main cutting edges in a formatting area determining the cutting width of the tool.

DESCRIPTION OF THE RELATED ART

Known cutting tools are comprised of a rotationally driven support body on whose circumference a plurality of cutting teeth having a cutting edge formed on the tooth profile are arranged. When cutting and formatting plastic materials, light metals, cement fiber sheets, wood and wood-based materials with a coating or the like, smooth cut surfaces and cut edges free of tearing are required. During cutting, the workpiece is separated wherein a separating cut is performed in the sheet material with the tool such as, for example, a circular saw blade. During formatting the cut-off part is comminuted in order to then remove it by means of a suction device. For this purpose, a chipping tool is conventionally used which produces a cut surface on the workpiece.

Available on the market are substantially two chipping tool designs. In a compact chipping tool a cutting row with many teeth is arranged on a support body for separating and adjacent thereto one or more cutting rows with a low number of teeth are provided for comminuting. The other design is a saw chipping tool in which only cutting rows with a low number of teeth are arranged on the support body. A tool with a cutting row having a high number of teeth, for example, in the form of a circular saw blade, is provided on an end face of the saw chipping tool.

In cutting tools, such as circular saw blades and the like especially for separating, a plurality of tooth profiles are known wherein the cutting edge shape or cutting edge arrangement is of special importance with respect to the cut surface and the cut edge quality. Especially in cutting tools with flat tooth geometry, whose separating cutting edges that are provided on the circumference of the tool extend parallel to the axis of rotation and whose greatest width is provided at the separating cutting edges, the impact of the separating cutting edges on the workpiece surface can be compared to a stamping process. By means of this stamping process chipping and cracks result in the entry area of the cutting teeth which must be removed by post processing of the workpiece. In order to reduce the stamping effect of the cutting teeth, it is known to provide the separating cutting edges with lateral bevels. The lateral bevels are designed to lead to the chipping being located within the width of the tooth by reducing the stamping effect. However, increased requirements with regard to the quality of the surface cannot be fulfilled with this measure.

For improving the cut edge quality it is also known to arrange successively cutting teeth with different tooth profiles. In this connection, adjacent to a raker a cutting tooth is arranged which ensures a high surface quality by means of a comparatively reduced material removal. It is also known to arrange together several identical cutting teeth which have arranged adjacent thereto a group of cutting teeth with a different profile shape. Circular saw blades of this type are referred to as circular saw blades with clustered teeth.

DE 35 41 077 A1 discloses a disk-shaped cutting tool with teeth arranged on the outer circumference and having each a cutting edge wherein the cutting edge is formed by a first cutting portion arranged parallel to the rotational axis of the tool and located on the cutting tip and an adjoining lateral cutting part extending in a plane perpendicular to the rotational axis. In the known cutting tool the transition of the cutting edge from the tooth tip to the location of the lateral cutting edges at the widest part of the tool is curved and has a tangential transition into this widest location of the tool. This measure is designed to achieve that the edge finishing cut of the tool to be processed is formed by a flat portion which has a continuous transition into a relatively long cutting edge part producing the workpiece edge. This is designed to reduce loading of the separating cutting edge on the circumference of the tool in the transitional areas to the laterally positioned auxiliary cutting edges as a result of cutting shock so that chipping of the workpiece is prevented. A disadvantage of this solution is that the arc-shaped contour of the lateral cutting edges can produce optimal results with the respective contour curve only for certain workpiece conditions. The arc-shaped cutting edge contours moreover can be produced only in a complicated fashion with the grinding wheels of a corresponding contour, respectively, on machine tools with a correspondingly efficient control.

A cutting blade with arc-shaped convexly formed saw tooth flank is also described in EP 0 691 170 A1. The transition between cutting edge of the cutting tooth and the arc-shaped convex saw tooth flank is designed to be formed in the known saw blade such that the spacing between the center of the saw tooth flank, which corresponds to the greatest tool width, and the symmetry plane of the saw tooth is greater than the spacing between the transition and the symmetry plane. When operating this saw blade, the chip width is however reduced during the cutting process and in the exit area is close to zero. In essence, the cutting edge upon penetrating the workpiece quickly has only a scraping and frictional effect. The scraping requires a substantially higher power output for driving the saw blade so that the range of application of this known circular saw blade is limited to machine tools with a high drive output or to the separation of very thin plates. Moreover, it is to be taken into consideration that there are a plurality of materials which contain greatly abrasive particles. These abrasive particles have an especially negative effect in the phase of scraping with the known circular saw blade and lead to a rounding of the cutting edges already after a very short period of time so that the cutting tool quickly becomes unusable.

DE 297 07 665 U1 discloses a saw tool for sawing wood and metals coated with plastic wherein the cut surface is produced in a similar way as with the cutting tool according to DE 35 41 077 A1 by a draw cut. The known saw tool is a so-called alternating tooth circular saw blade with paired teeth being pointed on one side and arranged successively. The respective second shape is a mirror-symmetrical shape of the first tooth. Since with this crossed tooth arrangement only the longer cutting edge, i.e., every other sawtooth, generates the cut surface quality, a high number of cutting teeth is required.

SUMMARY OF THE INVENTION

The present invention has the object to further develop the cutting tool of the aforementioned kind such that a separation and/or formatting of sheet material with cut edges free of tearing and with smooth cut surfaces is made possible while at the same time the required power output of the cutting tool should be as minimal as possible.

In accordance with the present invention, the object is solved in that the main cutting edges in the formatting area are arranged radially separately from the separating cutting edges in the front-cutting area by means of a transition area on the cutting tooth, wherein the transition cutting edges of the transition area adjoin the cutting edges at an angle extending toward the radial center axis of the tool profile.

According to the invention, the separating cutting edges in the front-cutting area positioned radially outwardly on the circumference of the tool are arranged radially separated from farther inwardly positioned main cutting edges in the formatting area, wherein the main cutting edges determine the cutting width. Between the front-cutting area and the formatting area a radial transition area is provided on each one of the cutting teeth, wherein the transition cutting edges of the transition area adjoin the separating cutting edges and are angled relative to the separating cutting edges toward the radial center axis of the tool profile. When operating the cutting tool according to the invention, the transition area between the front-cutting area and the formatting area interrupts the chip formation of the separating cutting edges. The radially farther inwardly positioned main cutting edges thus enter with time delay the workpiece and produced a cut surface of high-quality and a cut edge free of tearing. The separating cutting edges in the front-cutting area separate the workpiece surface and carry out the separating cut. The transition area of the cutting tooth improves moreover the guiding of the separating cutting edges.

The transition cutting edges are positioned at such an angle relative to the central axis and to the separating cutting edges that the chip formation in the separating cutting edges is interrupted. In this context, the transition cutting edges are arranged expediently approximately parallel to the center axis of the tooth profile.

The main cutting edges in the formatting area of the cutting tooth adjoin advantageously the transition cutting edges at an obtuse angle. In this connection, a polygonal profile of the cutting tooth in the front cutting area that is symmetrical with respect to the central axis has been found to be advantageous.

BRIEF DESCRIPTION OF THE DRAWING

Embodiments of the invention will be explained in more detail in the following with the aid of the drawing. It is shown in:

FIG. 1 a tooth profile in a cross-sectional plane of a cutting tool;

FIG. 2 the profile of the cutting tooth according to FIG. 1 in a plan view onto the cutting tool;

FIG. 3 an alternative cutting tooth profile in cross-sectional representation;

DESCRIPTION OF THE PREFERRED EMBODIMENTS

Figure 4:
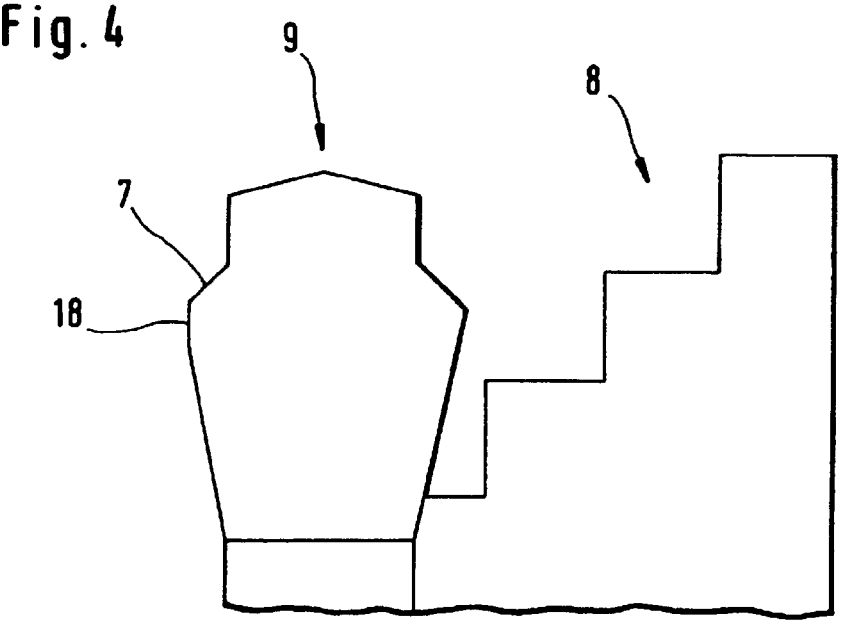
FIG. 4 a formatting tool with a separating tool and a chipping tool.

FIG. 1 shows a circular saw blades 9 whose disc-shaped support body 1 is rotatingly drivable about an axis of rotation 22 by a machine tool not represented in the drawing. The support body 1 is provided about its circumference with a plurality of cutting teeth 2 whose tooth profile with the cutting edge provided thereat can be seen in the present representation.

The cutting tooth 2 has a radially outwardly positioned front-cutting area 3 in which the separating cutting edges 5, 5' are formed which penetrate first the workpiece surface and perform the separating cut when operating the cutting tool. The separating cutting edges 5, 5' are arranged trapezoidally and positioned angularly relative to the center axis 19 of the tooth profile, wherein the separating cutting edges 5, 5' coincide and form a tooth tip at the level of the center axis 19. At the beginning of the cutting process, the material surface is separated with a point contact by the shown trapezoidal arrangement of the separating cutting edges 5, 5'. The front-cutting area 3 is guided in this connection through the radially adjacently positioned transition area 6, wherein the cutting forces are kept minimal and no vibrations resulting from transverse forces are generated which could cause damage to the cut edge. The transition area 6 is positioned between the front-cutting area 3 and the formatting area 4 of the cutting tooth 2, wherein the axial length of the transition area determines the time delay of entry of the main cutting edge 7, 7' into the material surface. Experiments have shown in this context that the delayed entry of the main cutting edges 7, 7' enhances the clean guiding of the separating cutting edges 5, 5' so that upon entry of the main cutting edges 7, 7' only minimal chipping will result in the cutting area and especially on the cut edge.

The course of the cutting edge of the cutting tooth is angled in the adjoining area of the separating cutting edges 5, 5' with the transition area 6 wherein the transition cutting edges 20 in the present embodiment are positioned approximately parallel to the center axis 19 of the cutting tooth 2. The transition cutting edges 20, 20' can however also be positioned at greater angles relative to the separating cutting edges 5, 5' and can, for example, taper radially inwardly toward the center axis 19. According to the invention, the transition cutting edges are formed at such an angle relative to the center axis 19 and to the separating cutting edges 5, 5' that the chip formation is interrupted at the separating cutting edges 5, 5'.

The formatting area 4 adjoins the transition area 6 and comprises the main cutting edges 7, 7' which determine the cutting width of the circular saw blade 9. The main cutting edges 7, 7' adjoin at an obtuse angle a the transition cutting edges 20, 20'. The main cutting edges 7, 7' remove the possibly present edge damage resulting from the preceding processing by means of the separating cutting action and smooth the cut surface.

The cutting tooth is mirror-symmetrical with respect to the center axis 19 of the tooth profile.

FIG. 2 shows a plan view of the cutting tooth 2 wherein for reasons of simplification the same reference numerals as in FIG. 1 are being used. In this context, especially the axial spacing of the separating cutting edges 5' from the main cutting edges 7' as a result of the transition area with the transition cutting edges 6' can be clearly seen.

FIG. 3 shows an alternative design of the cutting tooth 2' according to the invention in which the front-cutting area 3' is formed with a so-called roof-shaped separating cutting edge. In this connection, the separating cutting-edge 5* is positioned substantially parallel to the axis of rotation of the circular saw blade and is slanted at its outer end areas adjacent to the transition area 6'. In this way a stamping effect of the separating cutting edge 5* is prevented. Adjoining the front cutting area 3' is the transition area 6' with transition cutting edges similar to those disclosed in connection with FIG. 1 which are positioned substantially parallel to the center axis of the tooth profile. In the tooth profile according to FIG. 3, the main cutting edges in the formatting area 4' adjoin also at an obtuse angle α the transition cutting edges.

An arrangement of different cutting edge configurations or cutting teeth with different profiles successively arranged on the circumference of the support body 1 can be expedient for producing high cutting quality. In the inventive embodiment of the tool each cutting tooth has a cutting edge with quality-generating area. Each tooth 2 is provided with a main cutting edge 7, 7' which provides high surface quality. The cutting tool according to the invention provides, in comparison to conventional cutting tools with clustered teeth arrangement, a comparable chipping output with substantially reduced number of cutting edges.

FIG. 4 shows a formatting tool which comprises a cutting tool 9 similar to that of the representation according to FIG. 1, namely a circular saw blade. At the end face of the support body a chipping tool 8 is arranged which chips during operation of the tool the part of the sheet which has been separated by the saw blade 9. Along the course of the cutting edge of the cutting tooth, a so-called jointed auxiliary cutting edge 18 is provided adjacent to the main cutting edge 7 in the formatting area and is positioned approximately parallel to the center axis of the tooth profile. The jointed auxiliary cutting edge 18 makes possible a significantly increased runout precision of the tool.

Figure 5:
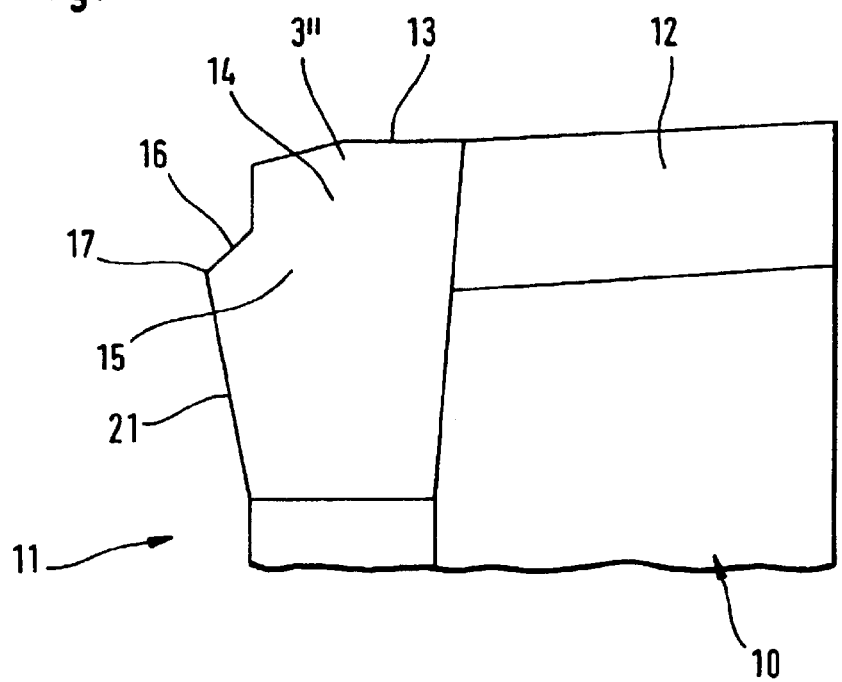
FIG. 5 a compact chipping tool.

FIG. 5 shows a compact chipping tool which is comprised of a base body 10 on whose end face a separating cutting tool 11 is arranged. On the circumference of the compact chipping tool raker edges 12 of the chipping tool portion are arranged adjacent to the circumferential cutting edges 13 in the front-cutting area 3" of the cutting tool 11. The raker edges 12 extend in the axial direction of the rotational axis of the compact chipping tool. The raker edges 12 are positioned radially inwardly spaced relative to the circumferential cutting edges 13 or the separating cutting edges in the front cutting area 3' on the circumference of the cutting tool. The separating cutting tool 11' has only on the outwardly positioned side, i.e., the side facing away from the chipping tool, the contour of the cutting edge according to the invention as has been described in connection with the circular saw blade according to FIGS. 1 through 3. The area of the circumferential cutting edge 13 facing the base body 10 serves only for separating the workpiece, and no requirements are placed on the cut edge quality.

The side opposite the chipping tool has formed thereat a cutting tooth contour with a front-cutting area 3", a transition area 14, and a main cutting edge 16. In the formatting area 15 a free cutting edge 21 is radially connected to the main cutting edge 16 and is positioned in the tooth profile at an angled position relative to the main cutting edge 16 in the direction toward the center. The main cutting edge 16 and the free cutting edge 21 abut at a cutting edge 17 which determines the working width of the tool and carries out the processing of the cut edge surface. The cutting edge 17, as is shown, for example, in FIG. 4, can be flattened and provided with a jointed auxiliary cutting edge 18. When after mounting of the tool on the drive shaft of the machine tool it is determined that runout errors are present, this runout error is eliminated in that runout of the formatting area 15 is provided by means of the jointed auxiliary cutting edges.

What is claimed is:

1. A cutting tool for separating and formatting of sheet materials, said cutting tool comprising:

a rotationally driven support body (1) having cutting teeth (2) arranged about a circumference of said support body (1), wherein said cutting teeth (2) have a tooth profile with a radially outwardly positioned front-cutting area (3) comprising separating cutting edges (5, 5') and a formatting area (4) with main cutting edges (7, 7') determining a cutting width of said cutting tool (9) and positioned radially inwardly relative to said front-cutting area (3);

wherein said tooth profile further comprises a transition area (6) connecting radially said front-cutting area (3) and said formatting area (4) with one another;

wherein said transition area (6) has transition cutting edges (20, 20') extending between said separating cutting edges (5, 5') and said main cutting edges (7, 7'), said transition cutting edges (20, 20') adjoining said separating cutting edges (5,5') at an angle and extending away from the separating cutting edges (5, 5') toward the main cutting edges (7, 7') in a direction toward a radial center axis (19) of said tooth profile;

wherein said separating cutting edges (5, 5') are symmetrical relative to said radial center axis (19) of said tooth profile.

2. The cutting tool according to claim 1, wherein said angle of said transition cutting edges (20, 20') relative to said separating cutting edges (5, 5') is such that chip formation of the sheet material at said separating cutting edges (5, 5') is interrupted.

3. The cutting tool according to claim 1, wherein said transition cutting edges (20, 20') are positioned approximately parallel to said radial center axis (19).

4. The cutting tool according to claim 1, wherein said main cutting edges (7, 7') adjoin said transition cutting edges (20, 20') at an obtuse angle (α), wherein said obtuse angle (α) opens in a direction away from said radial center axis (19).

5. The cutting tool according to claim 1, wherein said cutting tooth (2) has a polygonal profile in said front-cutting area (3).

6. The cutting tool according to claim 5, wherein said separating cutting edges (5, 5') are trapezoidally arranged and meet at said radial center axis (19) to form a tooth tip of said cutting tooth (2).

7. The cutting tool according to claim 5, wherein said separating cutting edges (5, 5') are arranged as a roof profile extending substantially perpendicularly to said radial center axis (19) and having opposed slanted ends remote from said radial center axis (19) and adjoining said transition cutting edges (20, 20').

8. The cutting tool according to claim 1, wherein said main cutting edges (7, 7') of said formatting area (4) are symmetrical relative to said radial center axis (19).

9. The cutting tool according to claim 1, wherein said formatting area (4) has a free cutting edge (21) positioned radially adjacent to said main cutting edge (7, 7'), said free cutting edge (21) positioned at an angle to said main cutting edge (7, 7') so as to point in a direction toward said center axis (19).

10. The cutting tool according to claim 9, wherein said tooth profile further has a jointed auxiliary cutting edge (18)

positioned between said main cutting edge (7, 7') and said free cutting edge (21) and extending approximately parallel to said radial center axis (19).

11. The cutting tool according to claim 1, wherein said tooth profiles of said cutting teeth (2) distributed about said circumference of said support body (11) differ from one another.

12. The cutting tool according to claim 1, comprising a chipping tool mounted on one end face of said support body (10), wherein said chipping tool has rakers (12) positioned circumferentially on said chipping tool and spaced radially inwardly from said separating cutting edges.

* * * * *